United States Patent [19]

Hashimoto et al.

[11] Patent Number: 5,053,898
[45] Date of Patent: Oct. 1, 1991

[54] RECORDING AND/OR REPRODUCING APPARATUS, PARTICULARLY WITH MEANS FOR SEARCHING FOR VACANT TRACKS

[75] Inventors: Seiji Hashimoto; Tokihiko Ogura, both of Kanagawa; Kuniji Osabe, Tokyo; Akimasa Nishimura; Makoto Takayama, both of Kanagawa, all of Japan

[73] Assignee: Canon Kabushiki Kaisha, Tokyo, Japan

[21] Appl. No.: 602,400

[22] Filed: Oct. 22, 1990

Related U.S. Application Data

[63] Continuation of Ser. No. 930,947, Nov. 10, 1986, abandoned, which is a continuation of Ser. No. 541,671, Oct. 13, 1983, abandoned.

[30] Foreign Application Priority Data

Oct. 15, 1982 [JP] Japan .................. 57-181808

[51] Int. Cl.$^5$ .................. G11B 19/02; G11B 21/02
[52] U.S. Cl. .................. 360/72.1; 360/75; 360/78.04; 369/32; 369/58
[58] Field of Search .................. 360/71–72.2, 360/75, 69, 60, 31, 27, 55, 57, 35.1, 77.02, 78.04, 77.06, 78.08; 369/32, 33, 30, 31, 41, 50, 47, 58, 56, 54

[56] References Cited

U.S. PATENT DOCUMENTS

| | | | |
|---|---|---|---|
| 4,065,795 | 12/1977 | Shutterly | 360/35.1 |
| 4,200,893 | 4/1980 | Matison | 360/72.1 |
| 4,224,644 | 9/1980 | Lewis et al. | 360/72.2 |
| 4,325,134 | 4/1982 | Langley et al. | 369/58 |
| 4,620,249 | 10/1986 | Suzaki et al. | 360/71 |
| 4,716,481 | 12/1987 | Tezuka | 360/77.02 |

FOREIGN PATENT DOCUMENTS

| | | | |
|---|---|---|---|
| 54-140507 | 10/1979 | Japan | 360/78 |
| 55-113137 | 9/1980 | Japan | 369/58 |
| 56-25236 | 3/1981 | Japan | 369/32 |
| 56-25238 | 3/1981 | Japan | 369/32 |
| 57-186268 | 11/1982 | Japan | 360/97 |
| 57-212660 | 12/1982 | Japan | 360/86 |
| 58-1809 | 1/1983 | Japan | 360/78 |
| 58-83312 | 5/1983 | Japan | 360/78 |
| 59-178603 | 10/1984 | Japan | 360/78 |

OTHER PUBLICATIONS

IBM TDB, vol. 19, No. 10, "Disk File Test Equipment", Blythin, Mar. 1977, pp. 3901–3902.

Primary Examiner—Aristotelis M. Psitos
Assistant Examiner—Steven R. Garland
Attorney, Agent, or Firm—Robin, Blecker, Daley & Driscoll

[57] ABSTRACT

In the disclosed recording and/or reproducing apparatus, a switch detects whether the recording medium is mounted on the apparatus and a signal detecting head detects whether a signal is recorded on each of the recording tracks of the medium. In response to the switch detecting that the medium is mounted on the apparatus, a control circuit causes the signal detecting head sequentially to scan the recording tracks on the recording medium one after another. A memory stores the output of the signal detecting head during the sequential scanning operation so that a vacant track search operation can be accomplished within a short period of time.

38 Claims, 5 Drawing Sheets

RECORDING AND/OR REPRODUCING APPARATUS, PARTICULARLY WITH MEANS FOR SEARCHING FOR VACANT TRACKS

This application is a continuation, of application Ser. No. 930,947, filed Nov. 10, 1986, which is a continuation of application Ser. No. 541,671, filed Oct. 13, 1983, both of which are now abandoned.

BACKGROUND OF THE INVENTION

1. Field of the Invention

This invention relates to a recording and/or reproducing apparatus which permits random access to recording tracks and is arranged to enhance the scanning head's efficiency.

2. Description of the Prior Art

Heretofore, developers have contrived various random access type recording and/or reproducing apparatus using recording media such as magnetic discs. In apparatus of this kind, information is often recorded on each track separately from information recorded on other tracks and is often erased independently of information recorded in other tracks. Therefore, when the apparatus is loaded with a disc that has undergone random erasing or a disc that has been only partially recorded, and one wishes to record on such a disc, an unrecorded track must be quickly located to rapidly shift the head to a position corresponding to the unrecorded track. In a conventional arrangement, the head is automatically shifted to the next recording track upon completion of recording on one track. If the next track is found already recorded on, the head is further shifted to another track until a vacant track is found. In such a conventional system, the head moves from one recording track to another while detecting the presence or absence of a recorded signal. Accordingly, the length of time required for accessing the vacant track increases with the number of tracks that must be skipped. Where it is only the last recording track that is found unrecorded and vacant, or where the recording medium has no vacant track, much time is wasted in a useless search and shift operation.

Another shortcoming of the conventional arrangement becomes evident when recording a signal requiring five or six tracks, for example, and only four consecutively vacant tracks remain. Recording would then have to be stopped unfinished and a valuable recording opportunity would be missed. Other arrangements have been contrived. In one, a track is provided in part of a recording disc especially set aside for recording a controlled signal. Information on the presence or absence of a record for a every recording track is recorded on the special, so that vacant tracks can be detected by reproducing the information recorded on the special. However, this system requires use of an additional recording reproducing head for the special track. This head must be shifted to a position corresponding to the special track each time a signal is recorded or erased from each of the recording tracks. Using such a method thus inevitably results in a complex structural and control arrangement.

The prior art thus has not been satisfactory with respect to a vacant track detecting or searching arrangement.

SUMMARY OF THE INVENTION

An object of the present invention is to provide a recording and/or reproducing apparatus which permits searching for vacant recording tracks at a higher speed than the conventional random access type recording and/or reproducing apparatuses.

Another object of the invention is to provide a recording and/or reproducing apparatus which permits the operator to readily detect the amount of vacant tracks.

A further object of the invention is to provide a recording and/or reproducing apparatus of improved operability for recording and play-back operations.

These and further objects and features of the invention will become apparent from the following detailed description of preferred embodiments thereof taken in connection with the accompanying drawings.

DETAILED DESCRIPTION OF PREFERRED EMBODIMENTS

Figure 1:
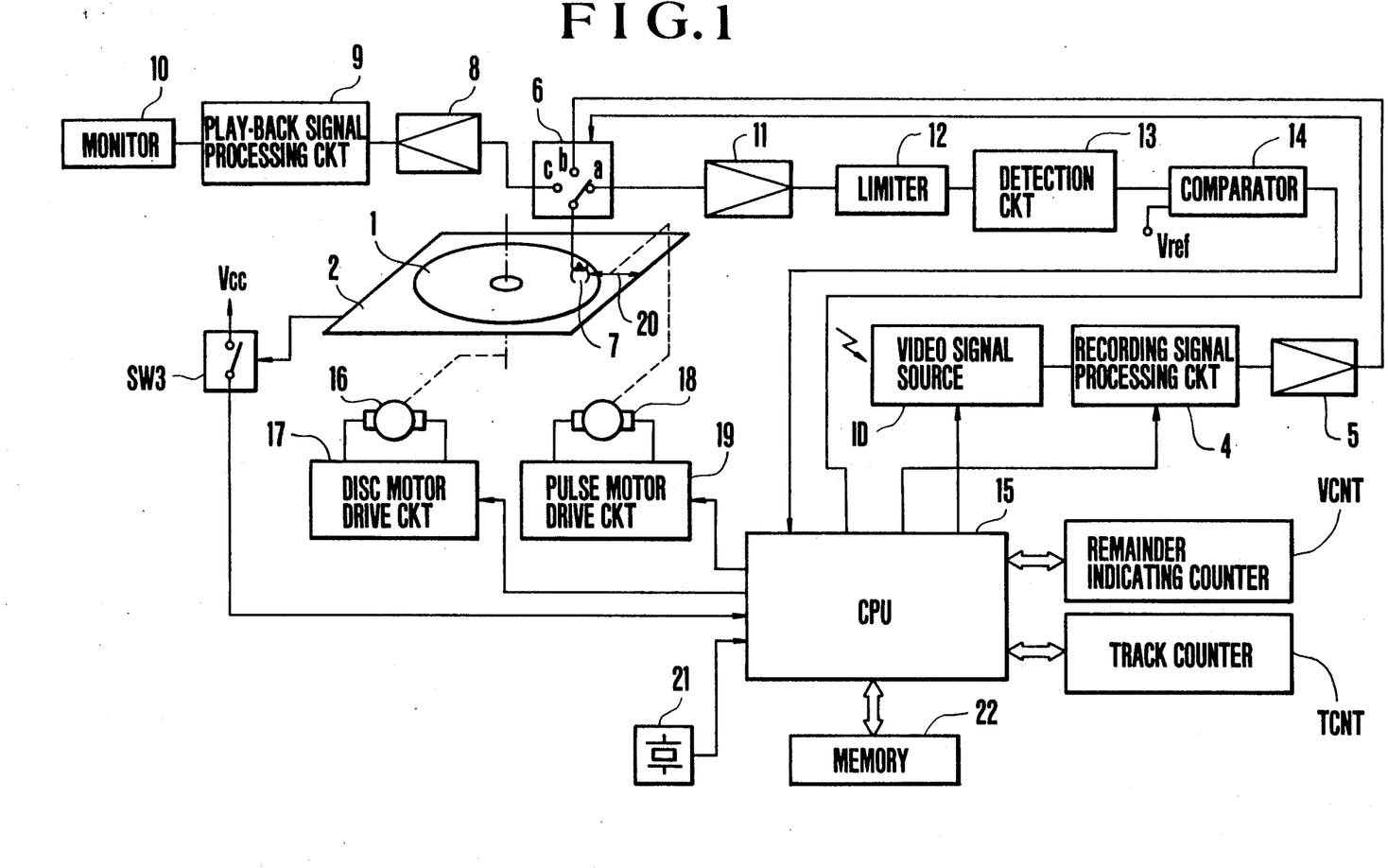
FIG. 1 is a block diagram showing a recording and/or reproducing apparatus as a first embodiment example of the invention.

FIG. 1 shows in a block diagram a recording and/or reproducing apparatus as a first embodiment example of the invention. A disc-shaped recording medium 1 is packaged in a cartridge 2. The recording medium 1 is attachable to and detachable from the apparatus together with the cartridge 2. A switch SW3 which is arranged to serve as means for detecting mounting of the cartridge 2 on the apparatus turns on when the cartridge 2 is mounted on the apparatus. The apparatus includes a video signal source ID which is an image sensing device or the like. The output of this signal source ID is either modulated or frequency converted or processed otherwise through a recording signal processing circuit into a state suitable for recording. The output which is thus processed is amplified by an amplifier 5 and then is guided via a switch to a recording and/or reproducing head 7.

A play-back signal from the head 7 is selectively guided by a switch 6 to a pre-amplifier 8. After amplification by the pre-amplifier 8, the play-back signal is demodulated at a play-back signal processing circuit 9 and then is received at a picture monitor 10. The play-back signal can also be guided to an amplifier 11 by shifting the switch 6 to a contact a thereof. The output of the amplifier 11 has its amplitude controlled by a limiter 12 and is subjected to a detection process at a detection circuit 13. A voltage level is then formed according to the presence or absence of a signal of RF (Radio frequency) band. The voltage level thus obtained is compared with a reference potential at a comparator 14 and then is made into a binary value. The binary output thus obtained is supplied to a CPU 15 (central processing unit) which is arranged to serve as control means. The amplifier 11, limiter 12, detection circuit 13, comparator 14, etc. jointly form signal detection means. The apparatus is provided with a disc rotating motor 16, which is driven by a disc motor drive circuit 17. The start, stopping and synchronization operations on the motor 16 are controlled by the CPU 15. A reference numeral 18 denotes a pulse motor. The pulse motor 18 is driven by a pulse motor drive circuit 19 to bring the head 7 to different tracks on the recording disc. The starting, stopping, synchronizing, access directions 20, etc. of the pulse motor 18 are controlled also by the CPU 15.

The apparatus further includes an oscillator 21 which supplied a reference signal to the CPU 15; a memory (M) 22 which serves as storage means for storing information as to whether or not a signal is recorded in each of the recording tracks on the disc 1; a remainder indicating counter VCNT which serves as counting means for indicating the total number of vacant tracks having no signal recorded therein on the disc; and a track counter TCNT arranged to indicate the address of the track which the head 7 is accessing. These counters are arranged to allow the operator to visually confirm the amount of the remaining recording tracks (or the number of vacant tracks) and the address of the track.

Figure 2:
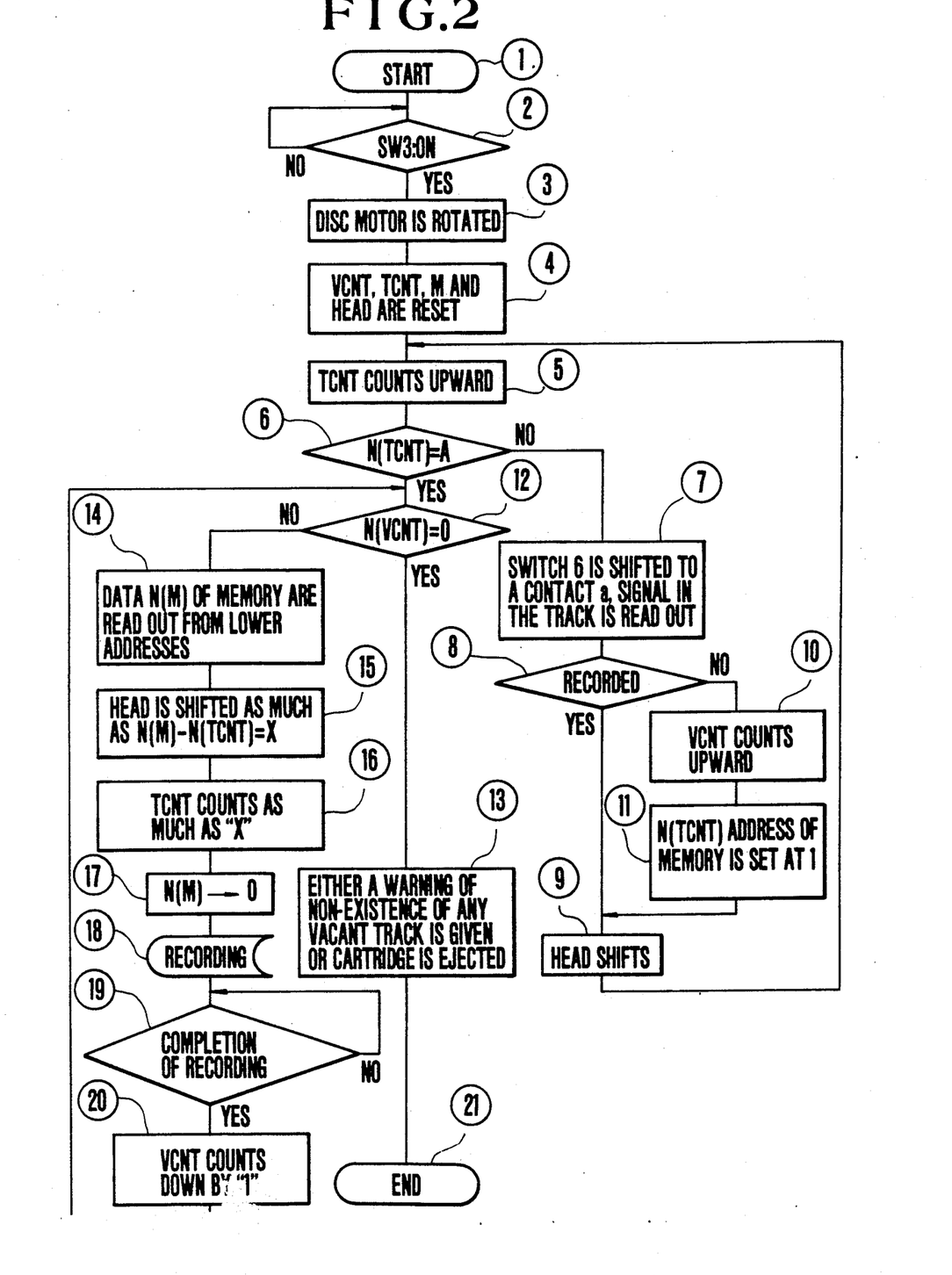
FIG. 2 is a flow chart showing the operation of a central processing unit (CPU) of the first embodiment.

The mode and procedures of control operation to be performed by the CPU 15 of the embodiment are shown in a flow chart in FIG. 2. Referring to FIG. 2, a program starts (step 1) when a power source switch which is not shown turns on. Then, it si confirmed whether or not the switch SW3 which is arranged to detect mounting of the cartridge on the apparatus turns on (step 2). Where the switch SW3 turns on, the disc motor is caused to rotate (step 3). After that, the track counter TCNT, the remainder indicating counter VCNT and the memory M are reset to their zero positions and the head 7 is reset to bring it back to a first track (step 4). The first track is located either in the outermost peripheral part or in the innermost part of the disc. The head is arranged to be shifted from the outermost track toward the innermost part or from the innermost track to the outermost part. Hereinafter, the former is called the forward shift while the latter shift in the direction reverse thereto is called the reverse shift.

Following the step 3, the track counter TCNT counts upward by one to obtain 1 as a count value (step 5). The count value of the track counter TCNT is checked to determine whether or not the value has reached a total number A of the tracks (step 6). If it has not reached the total track number A, a signal recorded in the track is read out via the contact a of the switch 6 (step 7). Then, the presence or absence of a recorded signal in the track to which the head is opposed is determined (step 8). In the event of presence of a recorded signal there, that is, if the comparator 14 produces a high level signal, the pulse motor drive circuit shifts the head in the forward direction to an extent corresponding to the width of one track (step 9). When a low level signal is produced from the comparator 14, the count value of the remainder indicating counter increases by one (step 10). Following this, 37 1"is inserted at an address which is set in the memory 1 M for the count value N(TCNT) of the track counter obtained at that time (step 11). By this, the number of vacant recording tracks is counted and, at the same time, the existence of the vacant tracks is memorized at the address corresponding to each of the vacant tracks.

After that, the operation comes back to the step 9 to carry out the forward shift of the head in the same manner as described above. The operation then comes back to the step 5 after the shift of the head.

With the presence or absence of signals having been detected for all the recording tracks, when the head arrives at the innermost track, the count value of the track counter becomes A and the operation comes to a step 12. At the step 12, the count value N(VCNT) of the remainder indicating counter is checked if it is 0 or not. If it is 0, either a warning is given by a sound or light to indicate that no vacant track is left or the cartridge is ejected (step 13).

In the event that the count value N(VCNT) of the remainder indicating counter is found not to be 0 at the step 12, information on the address of the vacant track which is stored in the memory M at the next step 13 is searched for from a lower address upward and an address N(M) of "1" that is first found is read out (step 14). At a next step 15, a count value N(TCNT) of the track counter which is obtained at that instant is computed with the address of the first vacant track. Then, the head is shifted according to a computed value thus obtained. In other words, $X = N(M) - N(TCNT)$ is computed. If the computed value X is $-3$ for example, the head is shifted in the reverse direction to an extent corresponding to three tracks.

As a result of this, the count value N(TCNT) of the track counter is adjusted by adding or subtracting X to or from the count value. For example, if $X = -3$, 3 is subtracted from the count value (step 16).

After the step 16, the datum at the memory address corresponding to this track address N(TCNT) is made to be "0". In other words, the vacant track information stored at the address within the memory is erased (step 17).

With the step 17 carried out, the position of the switch 6 is shifted to a contact b thereof for performing recording as necessary. A step 18 is a subroutine to be accomplished for that purpose. Completion or non-completion of recording is then determined (step 19). If the recording is found completed, the operation comes to a step 20 at which the count value of the remainder indicating counter VCNT is count down by one. Then, the operation again comes back to the step 12 to repeat this loop of process until there remains no vacant track. With no vacant track remaining, the operation comes to the step 13 at which either a warning of non-existence of any vacant track is given or the cartridge is ejected. Then, the program comes to an end. The embodiment arranged to perform a control operation in this manner offers the following advantages among others:

Since data on the recording tracks are separately recorded, the embodiment obviates the necessity of providing any additional special track and head. Before recording a video signal, the location and the number of vacant tracks can be found by just controlling a single ordinary recording/reproducing head. The access time required for the search of vacant recording tracks can be shortened. Among a plurality of recording sheet cartridges, a cartridge that has most suitable number of vacant recording tracks can be promptly distinguished and selected from others. Therefore, the embodiment permits advantageous use of a plurality of cartridges.

Figure 3:
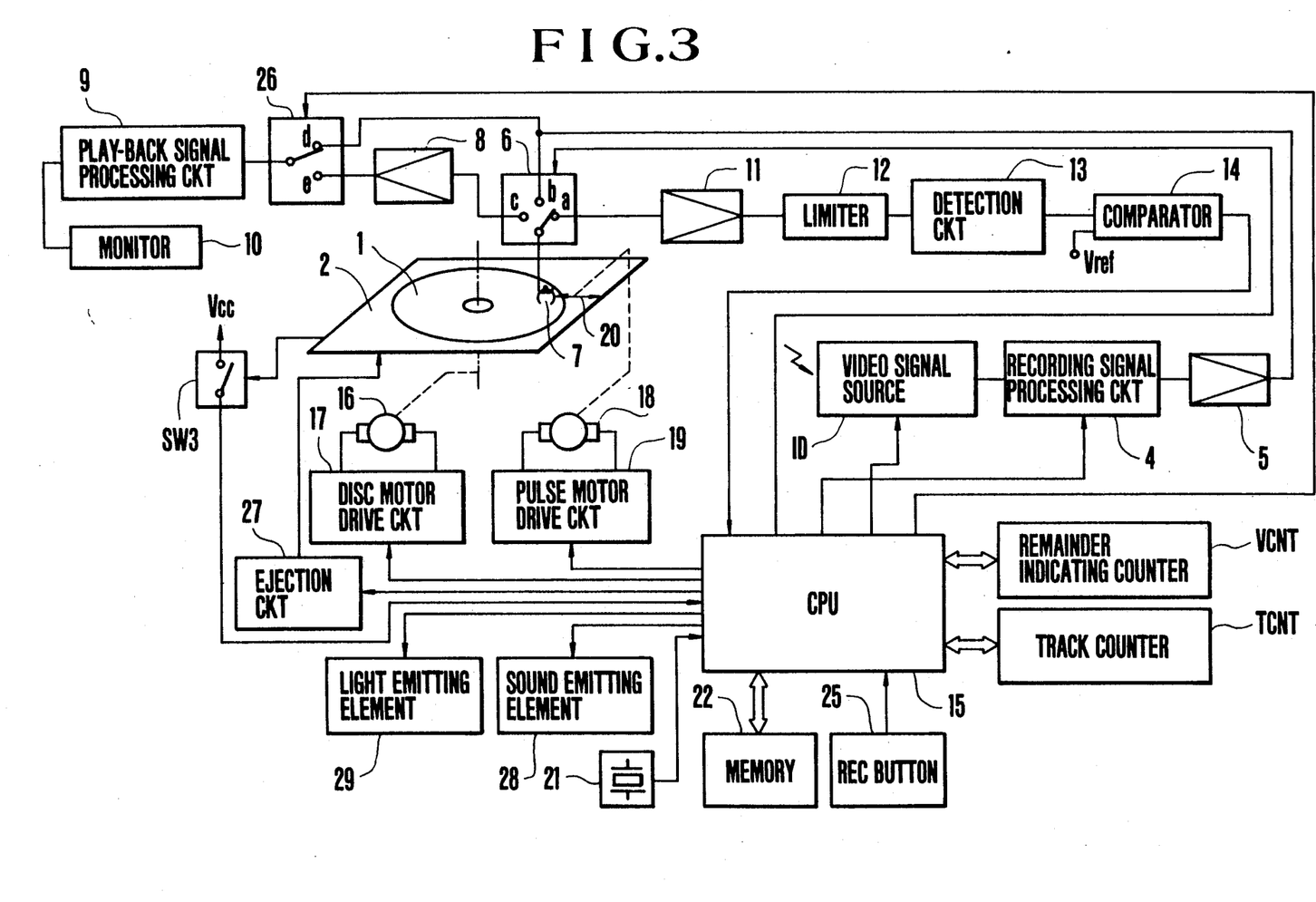
FIG. 3 is a block diagram showing a recording and/or reproducing apparatus as a second embodiment example of the invention.

A second embodiment exemplifying the invention is arranged as shown in FIG. 3. The second embodiment differs from the first embodiment example shown in FIG. 1 in the following points: In the second embodiment, a switch circuit 26 is provided between a play-back amplifier 8 and the play-back signal processing circuit 9; the second embodiment is provided with an ejection circuit 27 for ejecting the cassette (or cartridge), a sound emitting element 28 and a light emitting element 29 which are arranged to give a warning when there remains no vacant track; and a signal from a recording button 25 is arranged to be supplied to the CPU 15.

Figure 4:
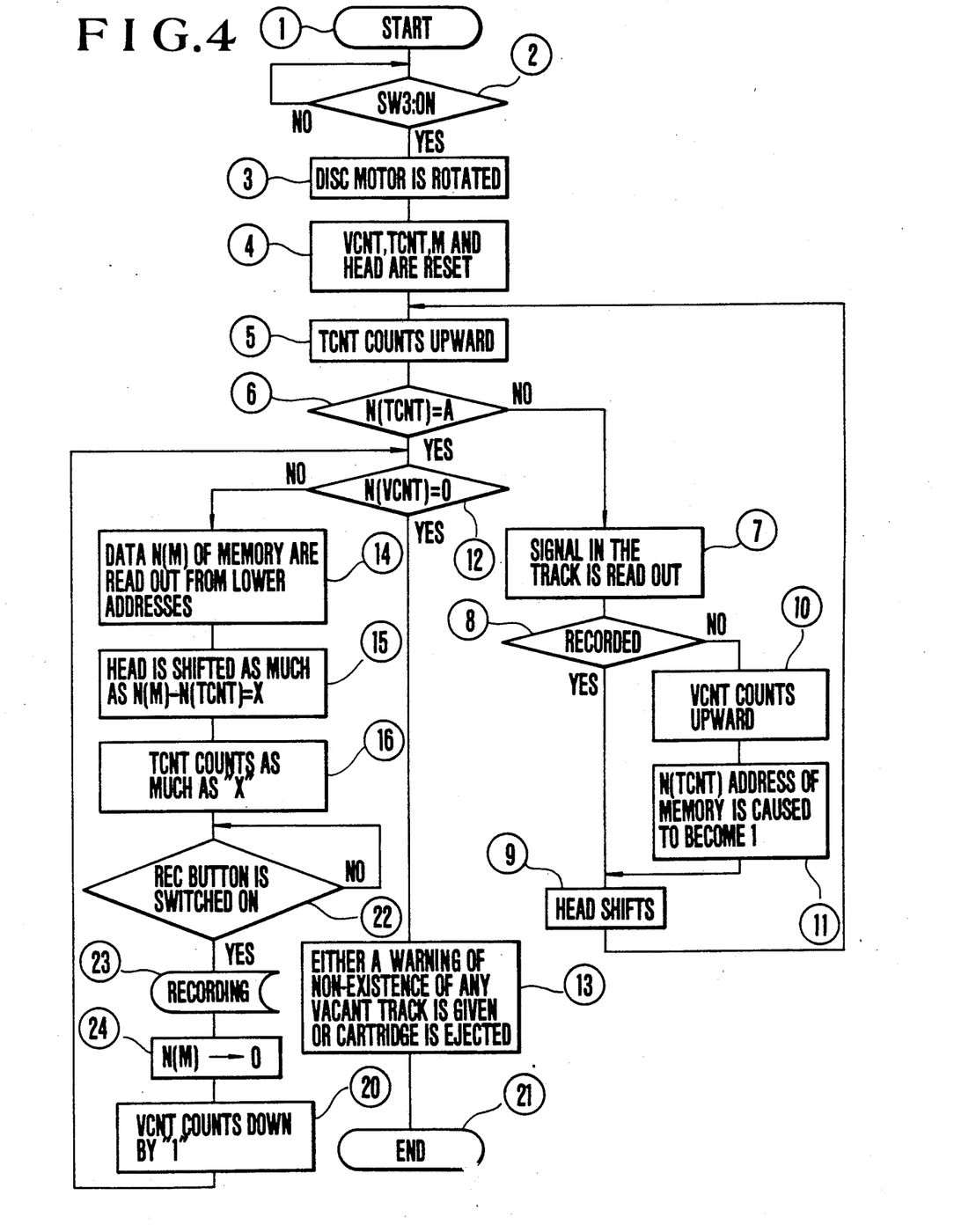
FIG. 4 is a flow chart showing the operation of a CPU of the second embodiment.

FIG. 4 is a flow chart showing the control operation of the second embodiment. The control operation of the second embodiment is carried out in the same manner as that of the first embodiment shown in FIG. 2 at the steps of the same step numbers. However, in the case of this embodiment, whether or not the recording button 25 is switched on is checked at a step 22 and this checking process is repeated until the recording button is switched on. When the recording button 25 is switched on, the operation comes to a step 23 where a subroutine for recording is carried out. This subroutine consists of steps as shown in FIG. 5.

Figure 5:
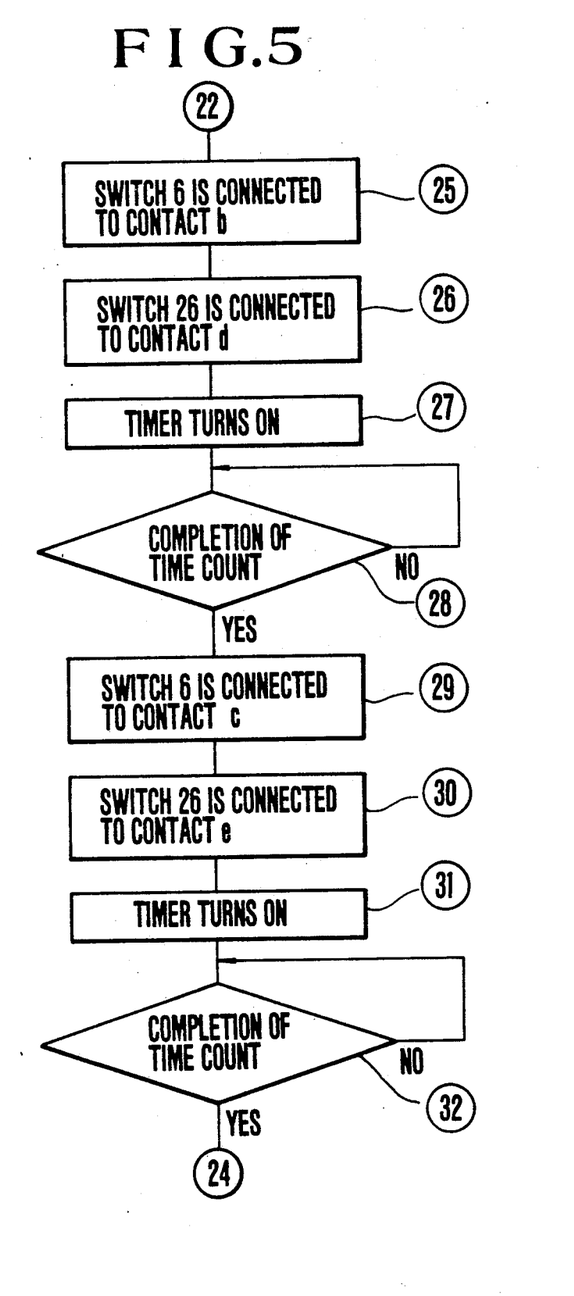
FIG. 5 is a flow chart showing the subroutine of a part of the flow chart of FIG. 4.

Referring now to FIG. 5, with the recording button switched on, the switch 6 is connected to the contact b thereof at a step 25. Therefore, a video signal from the video signal source ID is recorded on the recording medium 1. At a step 26, the switch 26 is connected to the contact d thereof. Therefore, the signal recorded on the recording medium 1 can be monitored by the monitor 10. At a step 27, a timer circuit within the CPU 15 is caused to begin time counting for the period of one TV field, for example. At a further step 28, completion or non-completion of this time counting is determined. The recording is considered to have been completed when this time counting comes to an end and the operation advances to a next step 29. The switch 6 is connected to the contact c thereof at the step 29. With the switch 6 connected to the contact c, a recorded video signal is played back for confirmation. The timer in the CPU 15 is then actuated to perform time counting, for example, for ten seconds. The operation advances to a step 32 at which the end of the time count is detected. The operation then comes to the step 20. At the step 24, the datum of an applicable track address within the memory is erased and it is memorized there that the track is recorded. The operation for the subsequent steps is identical with the flow chart of FIG. 2. Namely, at the step 20, the count value N(VCNT) of the remainder indicating counter VCNT is increased by "1". Following that, at the step 12, whether the count value N(VCNT) of the remainder indicating counter VCNT is zero or not is determined. If it is found zero, a warning is given by means of the sound emitting element 28 and the light emitting element 29. After that, the cartridge is ejected by the ejection circuit 27.

It is an advantage of the second embodiment over the first embodiment that the data of the memory about vacant tracks will never be changed before recording. The data on vacant tracks are arranged always to be changed after recording to ensure a more reliable operation. It is another advantage of the second embodiment that a recorded signal is played back for a prescribed period of time immediately after recording of the signal, so that the acceptability or non-acceptability of a picture thus obtained can be readily examined.

In the specific embodiments described above, the presence or absence of an RF signal in each of the recording tracks is arranged to be detected. However, in case of a format where, for example, some identification (ID) signal such as information on the address of each track or date (year, month and day) is to be recorded within a vertical blanking period in parallel with recording of the RF signal, the presence or absence of the RF signal, i.e. a video signal, may be determined by detecting this ID signal instead of detecting the RF signal. With respect to the ID signal, the signal either may be superimposed as a pulse signal during the vertical blanking period as mentioned above or may be converted into a low frequency having several horizontal periods H arranged to be 1 bit before it si superimposed on the video signal.

Further, in the examples of embodiments given above, the head is arranged to be shifted for the purpose of detecting a vacant recording track at the step 9. However, the invention is not limited to such arrangement. If the length of time required for shifting the head for this purpose is sufficiently longer than the length of time required for the process of the steps 5-8 (and steps 10 and 11), the shifting of the head may be arranged to be effected at about a constant speed from the first recording track up to an A-th track. Also, the head of course may be intermittently shifted.

What we claim:

1. A recording and/or reproducing apparatus comprising:
   (a) mounting detection means for detecting that a recording medium is mounted on the apparatus in a recordable position and for producing an output signal;
   (b) recording and/or reproducing means for recording and/or reproducing a signal on said recording medium at the recordable position;
   (c) signal detection means for detecting presence or absence of a signal in each of predetermined portions on said recording medium;
   (d) control means for causing said signal detection means to detect the presence or absence of the signal in each of the predetermined portions on said recording medium in predetermined sequence in response to the output of said mounting detection means;
   (e) memory means for storing detection signals produced by said signal detection means in said predetermined sequence; and
   (f) means for causing said recording and/or reproducing means to access to a position which is detected as a position absent of signal, on the basis of an information memorized in said memory means.

2. A recording and/or reproducing apparatus according to claim 1, wherein said signal detection means includes means for detecting signals of a predetermined frequency band.

3. A recording and/or reproducing apparatus according to claim 2, wherein said signal detection means includes detecting means for detecting signals of the predetermined frequency band and comparison means for comparing an output level of said detecting means with a prescribed reference level.

4. A recording and/or reproducing apparatus according to claim 1, further comprising count means for counting detection signals produced by said signal detection means.

5. A recording and/or reproducing apparatus according to claim 4, further including warning means for displaying a warning when a count value of said count means reach a predetermined value.

6. A recording and/or reproducing apparatus according to claim 1, said recording and/or reproducing means including a head arranged to record or reproduce signals on or from the predetermined portions on said recording medium.

7. A recording and/or reproducing apparatus according to claim 6, wherein said control means shifts said head on the basis of the detection signals stored by said memory means.

8. A recording and/or reproducing apparatus according to claim 6, wherein said signal detection means detects the presence or absence of a signal in each predetermined portion on said recording medium through an output of said head.

9. A recording and/or reproducing apparatus comprising:
(a) mounting detection means for detecting that a recording medium is mounted on the apparatus in a recordable position and for producing an output signal;
(b) recording and/or reproducing means for recording and/or reproducing a signal on said recording medium at the recordable position;
(c) signal detection means for detecting presence or absence of a signal in each of predetermined portions on said recording medium;
(d) control means for causing said signal detection means to detect the presence or absence of the signal in each of the predetermined portions on said recording medium in predetermined sequence in response to the output of said mounting detection means;
(e) memory means for storing detection signals produced by said signal detection means in said predetermined sequence;
(f) count means for counting detection signals produced by said signal detection means; and
(g) ejection means for ejecting said recording medium from said recordable position when a count value of the count means does not reach a predetermined value.

10. A recording apparatus comprising:
(a) mounting detection means for detecting that a recording medium is mounted on the apparatus in a recordable position and for producing an output signal;
(b) recording means for recording a signal on said recording medium at the recordal position;
(c) signal detection means for detecting presence or absence of a signal in each of predetermined portions on said recording medium;
(d) control means for causing said signal detecting means to detect the presence or absence of the signal in each of the predetermined portions on said recording medium in predetermined sequence in response to the output of said mounting detection means after accessing said signal detection means to a predetermined portion on said recording medium; and
(e) memory means for storing detection signals produced by said signal detection means in predetermined sequence; said control means causing said recording means to access a predetermined portion that is absent of the signal on the basis of the detection signals stored by said memory means.

11. A recording apparatus comprising:
(a) mounting detection means for detecting that a recording medium is mounted on the apparatus in a recordable position and for producing an output signal;
(b) recording means for recording a signal on said recording medium at the recordable position;
(c) signal detection means for detecting presence or absence of a signal in each of predetermined portions on said recording medium;
(d) control means for causing said signal detection means to detect the presence of absence of the signal in each of the predetermined portions on said recording medium in predetermined sequence in response to the output of said mounting detection means after accessing said signal detection means to a predetermined portion on said recording medium;
(e) memory means for storing detection signals produced by said signal detection means in said predetermined sequence; said control means being arranged to perform a control operation to sequentially position said recording means opposite a plurality of predetermined portions having no signal recorded therein as yet, said recording means being positioned opposite said plurality of predetermined portions in a predetermined sequence on the basis of the detection signals stored by said memory means.

12. A recording and/or reproducing apparatus comprising:
(a) mounting detection means for detecting that a recording medium is mounted on the apparatus in a recordable position and for producing an output signal;
(b) recording and/or reproducing means for recording and/or reproducing a signal on said recording medium at the recordable position;
(c) signal detection means for detecting presence or absence of a signal in each of a plurality of predetermined portions on said recording medium;
(d) control means for causing said signal detection means to detect the presence of absence of the signal in each of the predetermined portions on said recording medium in a predetermined sequence in response to the output of said mounting detection means;
(e) count means for counting the detection signals produced by said signal detection means;
(f) warning means for displaying a warning when a count value of said count means does not reach a predetermined value; and
(g) ejection means for ejecting said recording medium from said recordable position when said count value of the count means does not reach said predetermined value.

13. A recording apparatus comprising:
(a) mounting detection means for detecting that a recording medium is mounted on the apparatus in a recordable position and for producing an output signal;
(b) recording means for recording a signal on said recording medium at the recordable position;
(c) signal detection means for detecting presence or absence of a signal in each of a plurality of predetermined portions on said recording medium;
(d) control means for causing said signal detection means to detect the presence or absence of the signal in each of the predetermined portions on said recording medium in a predetermined sequence in response to the output of said mounting detection means; and (e) count means for counting the detection signals produced by said signal detection means;

said control means causing said recording means to access a predetermined portion that is absent of the signal on the basis of the detection signals.

14. A recording apparatus according to claim 13, wherein said signal detection means detects a presence or an absence of a predetermined frequency band in the signal in each of said predetermined portions.

15. A recording apparatus according to claim 14, wherein said signal detection means includes detecting means for detecting signals of the predetermined frequency band and comparison means for comparing an output level of said detecting means with a predetermined reference level.

16. A recording apparatus according to claim 13, further including warning means for displaying a warning when the count value of said count means does not reach a predetermined value.

17. A recording apparatus according to claim 13, wherein said control means performs a control operation to sequentially position said recording means opposite a plurality of predetermined positions having no signal recording therein as yet, said recording means being positioned opposite said plurality of predetermined positions in a prescribed sequence.

18. A recording apparatus according to claim 13, wherein said signal detection means detects a presence or an absence of a signal in each predetermined portion on said recording medium.

19. A recording apparatus according to claim 13, further including memory means for storing detection signals produced by said signal detection means at corresponding addresses in a predetermined sequence.

20. A method for detecting information recording tracks of a recording apparatus comprising:
(a) a step of detecting that a recording medium is mounted on the apparatus in a predetermined recordable position;
(b) a step of accessing signal detection means to recording tracks on said recording medium;
(c) a step of causing said signal detection means to sequentially determine from the recording tracks accessed by said signal detection means whether or not a signal is recorded in each of said recording tracks and to produce an indicating signal for each said determination, wherein said step includes controlling said accessing to shift said detecting means to each of said recording tracks to produce each said indicating signal;
(d) a step of storing, one after another, the results of said determinations, obtained during the process of the sequential determining step, into memory means; and
(f) a step of deciding a recording track to be recorded on as a track which has no signal recorded thereon, on the basis of that which is stored in said storing step.

21. A method according to claim 20, further including:
(e) a head position controlling step at which the position of a recording head is controlled on the basis of the results of said determination stored at said storing step.

22. A method for detecting information on recording tracks of a recording and/or reproducing apparatus comprising:
(a) a step of producing an indicating signal that indicates a recording medium is mounted on the apparatus in a predetermined recordable position;
(b) a step of accessing with signal detection means to predetermined recording tracks on said recording medium;
(c) a step of sequentially determining, from said predetermined recording tracks accessed by said signal detection means in response to said indicating signal producing step, whether or not a signal is recorded in each of the predetermined recording tracks on said recording medium; and
(d) a step of counting and visibly indicating the results of a determination obtained through the process of said determining step.

23. A recording and/or reproducing apparatus, comprising:
(a) electrical memory means for memorizing information concerning a recorded area and an unrecorded area on a recording medium;
(b) recording and/or reproducing means for controlling the recording and/or reproducing on the recording medium in accordance with contents of said memory means;
(c) position changing means for changing a position of said recording medium between a position where recording and/or reproducing of a signal is possible and a position where the recording and/or reproducing of the signal is impossible;
(d) indication means for indicating the change of the position of said recording medium by said position changing means; and
(e) control means for renewing the contents of said memory means.

24. A recording and/or reproducing apparatus according to claim 23, wherein said position changing means includes means for changing the position of the recording medium between a position mounted on said recording and/or reproducing apparatus and a position ejected from said apparatus.

25. A recording and/or reproducing apparatus according to claim 23, wherein said control means includes detection means for detecting a recorded area and an unrecorded area on the recording medium.

26. A recording and/or reproducing apparatus according to claim 25, wherein said detecting means detects an information reproduced from the recording medium by said recording and/or reproducing means.

27. A transducing apparatus for transducing a signal from or to a medium, comprising:
(a) first means for detecting that said medium is mounted on said apparatus in a transducable position and for producing an output signal;
(b) second means for transducing a signal from or to a plurality of predetermined portions of said medium;
(c) third means for detecting a presence or an absence of a signal in each of a plurality of predetermined portions in response to said output signal;
(d) fourth means for memorizing a result of detection of said plurality of predetermined portions detected by said third means; and
(e) fifth means for causing said second means to access a portion which is memorized by said fourth means as being absent of said signal.

28. An apparatus according to claim 27, wherein said first means includes a switch whose condition changes from a first state to a second state in response to said medium being mounted on said apparatus in said transducable position.

29. An apparatus according to claim 27, wherein said second means includes a transducing head which moves on said medium.

30. An apparatus according to claim 27, wherein said third means includes:
means for detecting that the signal transduced by said second means is larger than a predetermined level.

31. An apparatus according to claim 27, wherein said fourth means memorizes a presence or an absence of the signals at said plurality of predetermined portions.

32. A transducing apparatus for transducing a signal from or to medium, comprising:
(a) first means for detecting that said medium is mounted on said apparatus in a transducable position and for producing an output signal;
(b) second means for transducing a signal from or to a plurality of predetermined portions of said medium;
(c) third means for detecting a presence or an absence of a signal at each of a plurality of predetermined portions of said medium in response to said output signal and for memorizing each result of said detecting; and
(d) fourth means for causing said second means to access a portion which is memorized by said third means as being absent of said signal.

33. An apparatus according to claim 32, wherein said first means includes a switch whose condition changes from a first state to a second state in response to said medium being mounted on said apparatus in said transducable position.

34. An apparatus according to claim 32, wherein said second means includes a transducing head which moves on said medium.

35. An apparatus according to claim 34, wherein said medium is disc-shaped.

36. An apparatus according to claim 35, wherein said transducing head is movable in a radial direction of said disc-shaped medium.

37. An apparatus according to claim 32, wherein said fourth means causes said second means to access to said plurality of predetermined portions after absence or presence of the signals in the plurality of predetermined portions is memorized by said third means.

38. An apparatus according to claim 32, wherein said plurality of predetermined portions are provided in a predetermined number and said third means has at least a memory capacity as much as said predetermined number.

* * * * *